US008773289B2

(12) United States Patent
Maggiore et al.

(10) Patent No.: US 8,773,289 B2
(45) Date of Patent: Jul. 8, 2014

(54) RUNWAY CONDITION MONITORING

(75) Inventors: Jeanne C. Maggiore, Wildwood, MO (US); Wayne R. Majkowski, Florissant, MO (US); Kevin L. Swearingen, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 325 days.

(21) Appl. No.: 12/730,594

(22) Filed: Mar. 24, 2010

(65) Prior Publication Data

US 2013/0127642 A1 May 23, 2013

(51) Int. Cl.

| | |
|---|---|
| ***G08G 5/00*** | (2006.01) |
| ***B64F 1/20*** | (2006.01) |
| ***B60Q 1/00*** | (2006.01) |
| ***G08B 19/02*** | (2006.01) |
| ***G08B 21/00*** | (2006.01) |
| ***G08B 23/00*** | (2006.01) |
| ***G01C 21/00*** | (2006.01) |
| ***G01C 5/00*** | (2006.01) |
| ***G06F 7/70*** | (2006.01) |
| ***G06F 19/00*** | (2011.01) |
| ***G06G 7/00*** | (2006.01) |
| ***G05D 1/00*** | (2006.01) |

(52) U.S. Cl.
USPC ........ 340/947; 340/425.5; 340/438; 340/580; 340/962; 340/945; 340/963; 340/971; 340/972; 340/951; 340/948; 701/9; 701/14; 701/15

(58) Field of Classification Search
USPC .................. 340/947, 945, 958, 959, 961, 962
See application file for complete search history.

(56) References Cited

U.S. PATENT DOCUMENTS

| | | | | | |
|---|---|---|---|---|---|
| 2,849,701 | A | * | 8/1958 | Clark | 340/924 |
| 4,463,428 | A | | 7/1984 | Gilliam | |
| 4,827,416 | A | * | 5/1989 | Kawagoe et al. | 701/38 |
| 4,918,321 | A | | 4/1990 | Klenk et al. | |
| 5,014,042 | A | * | 5/1991 | Michoud et al. | 340/583 |
| 5,036,935 | A | | 8/1991 | Kohara | |
| 5,220,263 | A | | 6/1993 | Onishi et al. | |
| 5,237,404 | A | | 8/1993 | Tanaka et al. | |
| 5,318,254 | A | | 6/1994 | Shaw et al. | |
| 5,324,948 | A | | 6/1994 | Dudar et al. | |
| 5,334,982 | A | * | 8/1994 | Owen | 342/36 |
| 5,340,056 | A | | 8/1994 | Guelman et al. | |

(Continued)

FOREIGN PATENT DOCUMENTS

| | | | |
|---|---|---|---|
| EP | 0512866 | A1 | 11/1992 |
| EP | 1193168 | A2 | 4/2002 |

(Continued)

OTHER PUBLICATIONS

Screen capture of Merriam Webster dictionary definition, accessed Dec. 4, 2012.*

(Continued)

*Primary Examiner* — Daniel Wu
*Assistant Examiner* — Emily C Terrell
(74) *Attorney, Agent, or Firm* — Yee & Associates, P.C.

(57) ABSTRACT

A method and apparatus are present for monitoring a runway. Data is received about the runway from a number of sensors associated with an aircraft while the aircraft performs an operation on the runway. A number of conditions are identified for the runway using the data received from the number of sensors.

20 Claims, 7 Drawing Sheets

(56) References Cited

U.S. PATENT DOCUMENTS

| | | | | |
|---|---|---|---|---|
| 5,351,621 | A | 10/1994 | Tanaka et al. | |
| 5,416,476 | A * | 5/1995 | Rendon | 340/905 |
| 5,487,440 | A | 1/1996 | Seemann | |
| 5,490,646 | A | 2/1996 | Shaw et al. | |
| 5,586,028 | A * | 12/1996 | Sekine et al. | 701/1 |
| 5,633,707 | A | 5/1997 | Seemann | |
| 5,695,155 | A * | 12/1997 | Macdonald et al. | 244/134 F |
| 5,726,705 | A | 3/1998 | Imanishi et al. | |
| 5,831,570 | A * | 11/1998 | Ammar et al. | 342/26 B |
| 5,845,002 | A | 12/1998 | Heck et al. | |
| 5,845,725 | A | 12/1998 | Kawada | |
| 5,982,278 | A * | 11/1999 | Cuvelier | 340/436 |
| 5,995,884 | A | 11/1999 | Allen et al. | |
| 6,236,735 | B1 | 5/2001 | Bjorner et al. | |
| 6,266,138 | B1 | 7/2001 | Keshavmurthy | |
| 6,293,141 | B1 | 9/2001 | Nance | |
| 6,364,026 | B1 | 4/2002 | Doshay | |
| 6,476,712 | B1 | 11/2002 | Achterholt | |
| 6,565,361 | B2 | 5/2003 | Jones et al. | |
| 6,606,563 | B2 * | 8/2003 | Corcoran, III | 701/301 |
| 6,671,588 | B2 | 12/2003 | Otake et al. | |
| 6,819,265 | B2 | 11/2004 | Jamieson et al. | |
| 6,825,758 | B1 | 11/2004 | Laitsaari | |
| 6,888,446 | B2 | 5/2005 | Nantz et al. | |
| 6,904,335 | B2 | 6/2005 | Solomon | |
| 6,907,799 | B2 | 6/2005 | Jacobsen et al. | |
| 6,947,797 | B2 | 9/2005 | Dean et al. | |
| 6,984,952 | B2 | 1/2006 | Peless et al. | |
| 7,076,335 | B2 | 7/2006 | Seemann | |
| 7,212,106 | B2 | 5/2007 | Katou | |
| 7,218,993 | B2 | 5/2007 | Yasukawa et al. | |
| 7,236,861 | B2 | 6/2007 | Paradis et al. | |
| 7,280,890 | B2 | 10/2007 | Seemann | |
| 7,303,010 | B2 | 12/2007 | de Guzman et al. | |
| 7,327,112 | B1 | 2/2008 | Hlynka et al. | |
| 7,337,156 | B2 | 2/2008 | Wippich | |
| 7,414,523 | B2 | 8/2008 | Li et al. | |
| 7,417,738 | B2 * | 8/2008 | Taylor et al. | 356/445 |
| 7,499,772 | B2 | 3/2009 | Wilcox et al. | |
| 7,501,616 | B2 | 3/2009 | Wiklof | |
| 7,586,422 | B2 * | 9/2009 | Goodman et al. | 340/945 |
| 7,626,513 | B2 | 12/2009 | Goodman et al. | |
| 7,627,447 | B2 | 12/2009 | Marsh et al. | |
| 7,714,702 | B2 | 5/2010 | Khuzadi | |
| 7,765,038 | B2 | 7/2010 | Appleby et al. | |
| 7,765,668 | B2 | 8/2010 | Townsend et al. | |
| 7,796,018 | B2 | 9/2010 | Khuzadi | |
| 7,797,095 | B2 | 9/2010 | Rado | |
| 7,813,888 | B2 | 10/2010 | Vian et al. | |
| 7,817,026 | B2 | 10/2010 | Watabe et al. | |
| 7,832,281 | B2 | 11/2010 | Mian et al. | |
| 7,844,364 | B2 | 11/2010 | McLurkin et al. | |
| 7,860,618 | B2 | 12/2010 | Brandstetter et al. | |
| 7,894,948 | B2 | 2/2011 | Stroud | |
| 7,941,261 | B2 | 5/2011 | Johnsen | |
| 8,051,547 | B2 | 11/2011 | Toh et al. | |
| 8,060,270 | B2 | 11/2011 | Vian et al. | |
| 8,078,319 | B2 | 12/2011 | Franke et al. | |
| 8,140,250 | B2 | 3/2012 | Mian et al. | |
| 8,145,367 | B2 | 3/2012 | Khatwa et al. | |
| 8,150,105 | B2 | 4/2012 | Mian et al. | |
| 8,181,532 | B2 | 5/2012 | Schmidt et al. | |
| 8,260,485 | B1 | 9/2012 | Meuth et al. | |
| 8,504,505 | B2 | 8/2013 | Mintah | |
| 2003/0089183 | A1 | 5/2003 | Jacobsen et al. | |
| 2003/0125848 | A1 * | 7/2003 | Otake et al. | 701/3 |
| 2003/0135327 | A1 * | 7/2003 | Levine et al. | 701/220 |
| 2003/0169335 | A1 | 9/2003 | Monroe | |
| 2004/0030571 | A1 | 2/2004 | Solomon | |
| 2004/0036630 | A1 * | 2/2004 | Jamieson et al. | 340/962 |
| 2004/0046712 | A1 | 3/2004 | Naimer et al. | |
| 2004/0054507 | A1 * | 3/2004 | Mott | 702/196 |
| 2004/0073324 | A1 | 4/2004 | Pierro et al. | |
| 2004/0073411 | A1 | 4/2004 | Alston et al. | |
| 2004/0158358 | A1 | 8/2004 | Anezaki et al. | |
| 2005/0033517 | A1 * | 2/2005 | Kondoh et al. | 701/301 |
| 2005/0046569 | A1 * | 3/2005 | Spriggs et al. | 340/551 |
| 2005/0073585 | A1 | 4/2005 | Ettinger et al. | |
| 2005/0113943 | A1 | 5/2005 | Nian | |
| 2005/0126794 | A1 | 6/2005 | Palmer et al. | |
| 2005/0217589 | A1 | 10/2005 | Daniel et al. | |
| 2006/0085106 | A1 | 4/2006 | Gaudiano et al. | |
| 2006/0184291 | A1 | 8/2006 | Paradis et al. | |
| 2006/0198952 | A1 | 9/2006 | Nagase et al. | |
| 2006/0243857 | A1 | 11/2006 | Rado | |
| 2006/0271251 | A1 | 11/2006 | Hopkins | |
| 2007/0062299 | A1 | 3/2007 | Mian et al. | |
| 2007/0081154 | A1 | 4/2007 | Mapoles et al. | |
| 2007/0129847 | A1 | 6/2007 | Ulmer et al. | |
| 2007/0146728 | A1 | 6/2007 | Pristner | |
| 2007/0203633 | A1 * | 8/2007 | Johnsen | 701/70 |
| 2007/0208442 | A1 | 9/2007 | Perrone | |
| 2008/0004749 | A1 | 1/2008 | Hostettler | |
| 2008/0021604 | A1 | 1/2008 | Bouvier et al. | |
| 2008/0140318 | A1 * | 6/2008 | Breed | 702/3 |
| 2008/0148876 | A1 | 6/2008 | Hock et al. | |
| 2008/0252489 | A1 * | 10/2008 | Naimer et al. | 340/971 |
| 2008/0270866 | A1 | 10/2008 | Choi et al. | |
| 2008/0297333 | A1 | 12/2008 | Khuzadi | |
| 2008/0297375 | A1 | 12/2008 | Khuzadi | |
| 2009/0079839 | A1 | 3/2009 | Fischer et al. | |
| 2009/0219393 | A1 | 9/2009 | Vian et al. | |
| 2009/0243828 | A1 | 10/2009 | Hering et al. | |
| 2009/0285491 | A1 | 11/2009 | Ravenscroft et al. | |
| 2010/0017052 | A1 | 1/2010 | Luce | |
| 2010/0023201 | A1 | 1/2010 | Kinney et al. | |
| 2010/0039294 | A1 * | 2/2010 | Feyereisen et al. | 340/972 |
| 2010/0063650 | A1 | 3/2010 | Vian et al. | |
| 2010/0094487 | A1 * | 4/2010 | Brinkman | 701/14 |
| 2010/0211358 | A1 | 8/2010 | Kesler et al. | |
| 2010/0235037 | A1 | 9/2010 | Vian et al. | |
| 2010/0250022 | A1 | 9/2010 | Hines et al. | |
| 2010/0271191 | A1 | 10/2010 | de Graff et al. | |
| 2010/0312387 | A1 | 12/2010 | Jang et al. | |
| 2010/0312388 | A1 | 12/2010 | Jang et al. | |
| 2011/0313614 | A1 | 12/2011 | Hinnant, Jr. et al. | |
| 2012/0038492 | A1 | 2/2012 | Maggiore et al. | |
| 2012/0041639 | A1 | 2/2012 | Followell et al. | |
| 2012/0081540 | A1 | 4/2012 | Jang | |
| 2012/0130701 | A1 | 5/2012 | Khella | |
| 2012/0261144 | A1 | 10/2012 | Vian et al. | |

FOREIGN PATENT DOCUMENTS

| | | | |
|---|---|---|---|
| EP | 1619625 | | 1/2006 |
| EP | 1884453 | A2 | 2/2008 |
| EP | 2208971 | | 7/2010 |
| EP | 2259245 | A2 | 8/2010 |
| FR | 2922072 | A1 | 4/2009 |
| FR | 2930669 | A1 | 11/2009 |
| GB | 2308656 | | 7/1997 |
| GB | 2429819 | | 3/2007 |
| JP | 2007183172 | | 7/2007 |
| WO | WO2004081488 | | 9/2004 |
| WO | WO2005113261 | | 12/2005 |
| WO | WO2006053433 | | 5/2006 |
| WO | WO2007080584 | | 7/2007 |
| WO | 2008127468 | A2 | 10/2008 |
| WO | 2009142933 | A2 | 11/2009 |
| WO | WO2010141180 | | 12/2010 |
| WO | WO2011119634 | | 9/2011 |
| WO | WO2012021177 | | 2/2012 |
| WO | WO2012021179 | | 2/2012 |
| WO | WO2012047479 | | 4/2012 |

OTHER PUBLICATIONS

Internet archive of dictionary definition for vector, accessed Dec. 4, 2012.*

PCT Notification of Transmittal of the International Search Report and the Written Opinion of the International Searching Authority, International Publication No. PCTUS2011029466, international filing date Mar. 22, 2011.

(56) References Cited

OTHER PUBLICATIONS

GB Combined Search and Examination Report for application P49034GB/AER dated Jun. 10, 2010.
PCT Search Report for application PCT/US2010/033917 dated Nov. 26, 2010.
"In-Sight Line Scan Vision System", Cognex, Webinar, retrieved Feb. 5, 2010, 17 pages.
Ollero, "Mutliple Heterogenous Unmanned Aerial Vehicles", Springer Tracts in Advanced Robotics, vol. 37, Copyright 2007, 233 pages (Abstract).
"Unmanned Aerial Vehicle (UAV) ZALA 421-04M chosen for Aerial Monitoring of Forest Fires", published by news.wood.ru, Feb. 2010, 3 pages.
Frost, "A Practical Guide to Using the In-Sight 5604 Line Scan Vision System", Cognex, In-Sight Vision Systems, Mar. 2009, 20 pages.
Gunatilake et al., "Image Understanding Algorithms for Remote Visual Inspection of Aircraft Surfaces", Proceedings of the SPIE conference on Machine Vision Applications in Industrial Inspection V, Copyright 1997, 12 pages.
DeVAULT, "Robotic system for underwater inspection of bridge piers", IEEE Instrumentation & Measurement Magazine, vol. 3, Iss. 3, Sep. 2000, pp. 32-37 (Abstract).
GB Search Report and Examination Report dated Jun. 14, 2011 regarding application GB1100763.0, applicant's reference P51280GB/AER/LJW, applicant The Boeing Company, 9 pages.
PCT Search Report and Written Opinion dated Jun. 8, 2011 regarding international application PCT/US2011/029766, applicant's reference 10-0173PCT, applicant The Boeing Company, 9 pages.
PCT Search Report dated Feb. 16, 2012 regarding international application PCT/US2011/030150, applicant's reference 10-0174PCT, applicant The Boeing Company, 6 pages.
USPTO Office Action dated Oct. 4, 2011 regarding U.S. Appl. No. 12/701,033, 24 pages.
USPTO Final Office Action dated Apr. 13, 2012 regarding U.S. Appl. No. 12/701,033, 18 pages.
USPTO Office Action dated Apr. 13, 2012 regarding U.S. Appl. No. 12/404,493, 22 pages.
USPTO Office Action dated Jun. 15, 2012 regarding U.S. Appl. No. 13/086,521, 18 pages.
USPTO Office Action dated Nov. 8, 2010 regarding U.S. Appl. No. 12/124,565, 13 pages.
USPTO Final Office Action dated Mar. 15, 2011 regarding U.S. Appl. No. 12/124,565, 14 pages.
USPTO Notice of Allowance dated Aug. 18, 2011 regarding U.S. Appl. No. 12/124,565, 7 pages.
USPTO Office Action dated Feb. 24, 2012 regarding U.S. Appl. No. 12/560,569, 27 pages.
USPTO Final Office Action dated Jul. 24, 2012 regarding U.S. Appl. No. 12/560,569, 23 pages.
USPTO Office Action dated May 10, 2011 regarding U.S. Appl. No. 12/372,616, 27 pages.
USPTO Final Office Action dated Oct. 28, 2011 regarding U.S. Appl. No. 12/372,616, 30 pages.
USPTO Office Action dated Feb. 15, 2012 regarding U.S. Appl. No. 12/372,616, 22 pages.
USPTO Final Office Action dated Jul. 12, 2012 regarding U.S. Appl. No. 12/372,616, 23 pages.
USPTO Office Action dated Feb. 21, 2012 regarding U.S. Appl. No. 12/479,667, 25 pages.
Kesler et al., "Automated Postflight Troubleshooting Sensor Array", U.S. Appl. No. 12/701,033, filed Feb. 5, 2010, 54 pages.
USPTO non-final office action dated Aug. 31, 2012 regarding U.S. Appl. No. 12/854,646, 19 pages.
USPTO Office Action dated Aug. 31, 2012 regarding U.S. Appl. No. 12/701,033, 28 pages.
USPTO Final Office Action dated Oct. 3, 2012 regarding U.S. Appl. No. 12/404,493, 18 pages.
Office Action, dated Dec. 21, 2012, regarding U.S. Appl. No. 12/372,616, 39 pages.
Final Office Action, dated Jan. 8, 2013, regarding U.S. Appl. No. 12/701,033, 27 pages.
Office Action, dated Dec. 6, 2012, regarding U.S. Appl. No. 12/897,158, 51 pages.
Office Action, dated Sep. 10, 2013, regarding U.S. Appl. No. 12/372,616, 25 pages.
Office Action, dated Sep. 12, 2013, regarding U.S. Appl. No. 12/701,033, 25 pages.
Office Action, dated Jul. 18, 2013, regarding U.S. Appl. No. 12/404,493, 42 pages.
Office Action, dated Aug. 28, 2013, regarding U.S. Appl. No. 12/560,569, 46 pages.
Notice of Allowance, dated Jul. 31, 2013, regarding U.S. Appl. No. 12/854,646, 19 pages.
Final Office Action, dated Jul. 12, 2013, regarding U.S. Appl. No. 12/854,671, 17 pages.
Final Office Action, dated Jun. 26, 2013, regarding U.S. Appl. No. 12/897,158 38 pages.
European Patent Office Communication, dated Jul. 23, 2013, regarding Application No. EP11713911.3, 6 pages.
Final Office Action, dated Mar. 7, 2013, regarding U.S. Appl. No. 12/854,646, 22 pages.
Office Action, dated Mar. 28, 2013, regarding U.S. Appl. No. 12/854,671, 37 pages.
Final Office Action, dated Dec. 13, 2013, regarding U.S. Appl. No. 12/404,493, 24 pages.
Notice of Allowance, dated Dec. 13, 2013, regarding U.S. Appl. No. 12/854,671, 16 pages.
Final Office Action, dated Feb. 21, 2014, regarding U.S. Appl. No. 12/701,033, 31 pages.
Final Office Action, dated Feb. 19, 2014, regarding U.S. Appl. No. 13/086,521, 18 pages.
Final Office Action, dated Feb. 28, 2014, regarding U.S. Appl. No. 12/560,569, 43 pages.

* cited by examiner

RUNWAY CONDITION MONITORING

BACKGROUND INFORMATION

1. Field

The present disclosure relates generally to an improved data processing system, and more specifically to an improved data processing system for monitoring a runway.

2. Background

Runways are areas commonly used for aircraft to travel during takeoff, while traveling on the ground, and during landing. As used herein, runways also include taxiways. Runways are frequently paved with a material that supports the aircraft as the aircraft travels over the runway. For example, the runway may reduce the amount of shock absorbed by the aircraft while traveling over the runway, as opposed to traveling over bare earth.

Conditions that develop on runways vary with weather and other phenomenon. For example, snow may accumulate on a runway until the snow melts or the snow is cleared by a plow or snow-melting agent. Other conditions that develop on runways include, for example, without limitation, standing water, slush, ice, debris, indentations, and plant growth that extends onto the runway. In other examples, inconsistencies develop in the runway. For example, a pothole may develop in the runway due to a combination of a snow-melting agent and frequent use by aircraft. In another example, inconsistencies develop in the runway due to one or more objects impacting the runway.

Conditions for a runway are noted by pilots of aircraft that are using the runway or by equipment at an airport. The pilots or equipment operators communicate the conditions for the runway to air traffic controllers. In some examples, the air traffic controllers inform other aircraft in the geographic area of the conditions or update a database of conditions with the information received from the pilots.

Therefore, it would be desirable to have a method and apparatus that may overcome one or more of the issues described above, as well as other possible issues.

SUMMARY

In one advantageous embodiment, a method for monitoring a runway is provided. Data is received about the runway from a number of sensors associated with an aircraft while the aircraft performs an operation on the runway. A number of conditions are identified for the runway using the data received from the number of sensors.

In another illustrative embodiment, an apparatus for monitoring a runway is provided. A number of sensors are associated with an aircraft. The number of sensors is configured to generate data about a runway while the aircraft performs an operation on the runway. The apparatus also comprises a computer system in the aircraft. The computer system is configured to receive the data from the number of sensors and identify a number of conditions for the runway using the data received from the number of sensors.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
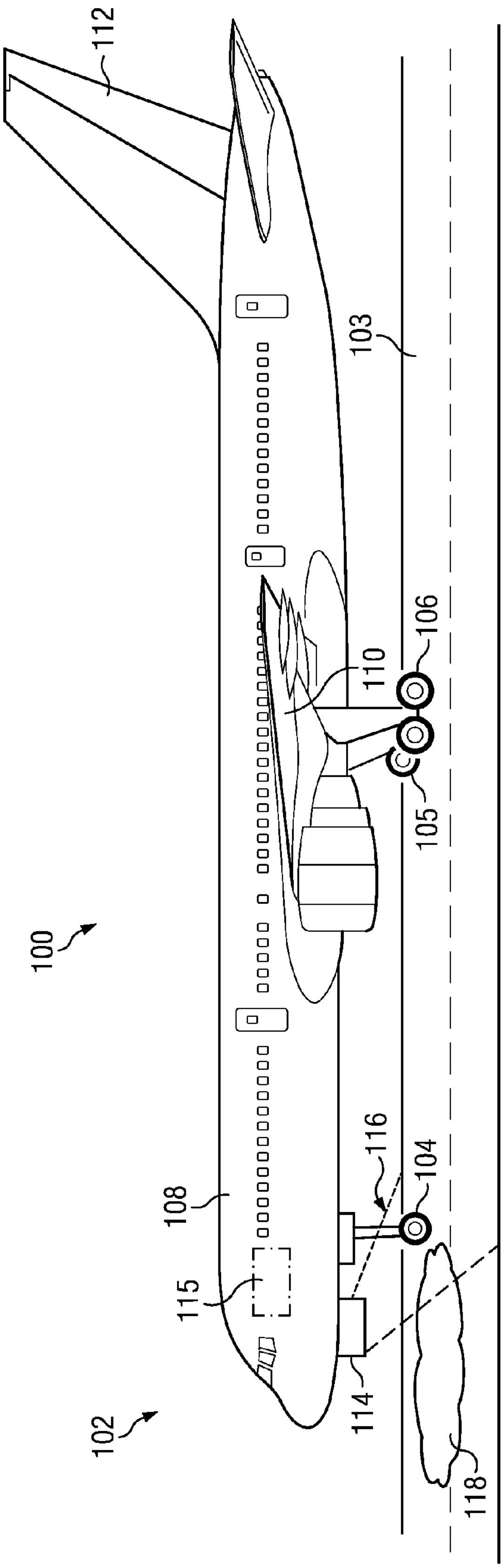
FIG. 1 is an illustration of a monitoring environment in accordance with an advantageous embodiment.

Referring now to FIG. 1, an illustration of a monitoring environment is depicted in accordance with an advantageous embodiment. In this illustrative example, monitoring environment 100 comprises aircraft 102 and runway 103. Aircraft 102 is in the process of landing on runway 103 in this illustrative example. In other illustrative examples, aircraft 102 may be taxiing or taking off from runway 103.

As depicted in this example, aircraft 102 has wheels 104, 105, and 106, fuselage 108, wing 110, another wing (not shown), and tail 112. Further, number of sensors 114 is associated with aircraft 102. A first component may considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

In these examples, number of sensors 114 is connected to the underside of fuselage 108 of aircraft 102. Number of sensors 114 generates data. Data may be generated by number of sensors 114 periodically or constantly. In this advantageous embodiment, the data is imaging data. However, the data may also comprise at least one of radar data, light detection and ranging data (LIDAR), camera data, infrared data, and other suitable types of data.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, number of sensors 114 may be pointed in direction 116. Direction 116 is pointed towards wheel 104. Number of sensors 114 generates data for direction 116. In other advantageous embodiments, number of sensors 114 may be pointed towards runway 103 under and in front of aircraft 102 or in some other suitable direction.

In this advantageous embodiment, computer system 115 is located onboard aircraft 102. Computer system 115 receives data from number of sensors 114. This data received from number of sensors 114 may contain an indication of standing water 118 on runway 103. In response to receiving data indicating standing water 118, computer system 115 may identify standing water 118 as a condition affecting runway 103. Computer system 115 may then send an identification of the condition to a location remote to the aircraft. In some advantageous embodiments, the location is a second aircraft or an air traffic controller. However, in other advantageous embodiments, the location is a surface friction database.

Computer system 115 onboard aircraft 102 may identify other conditions using additional input, such as a braking distance of aircraft 102 during landing being greater than a specified distance. In other advantageous embodiments, a condition on runway 103 is detected when computer system 115 detects that the directional vector of wheel 104 differs from the directional vector of aircraft 102. A directional vector has a direction in which an object is facing and/or moving in these illustrative examples. As one specific example, a difference in the directional vectors for wheel 104 and aircraft 102 may indicate skidding.

The illustration of monitoring environment 100 in FIG. 1 is not meant to imply physical or architectural limitations to the manner in which different features may be implemented. Other components in addition to and/or in place of the ones illustrated may be used. Some components may be unnecessary in some advantageous embodiments. Also, the elements are presented to illustrate some functional components. One or more of these elements may be combined and/or divided into different elements when implemented in different advantageous embodiments.

For example, number of sensors 114 may be associated with another part of aircraft 102, such as wing 110, rather than the underside of fuselage 108 of aircraft 102. Additionally, computer system 115 may identify a number of conditions for runway 103 in addition to or in place of standing water 118. For example, without limitation, the number of conditions identified may include ice, slush, indentations, debris, plant growth that extends onto runway 103, and/or other types of conditions.

Figure 2:
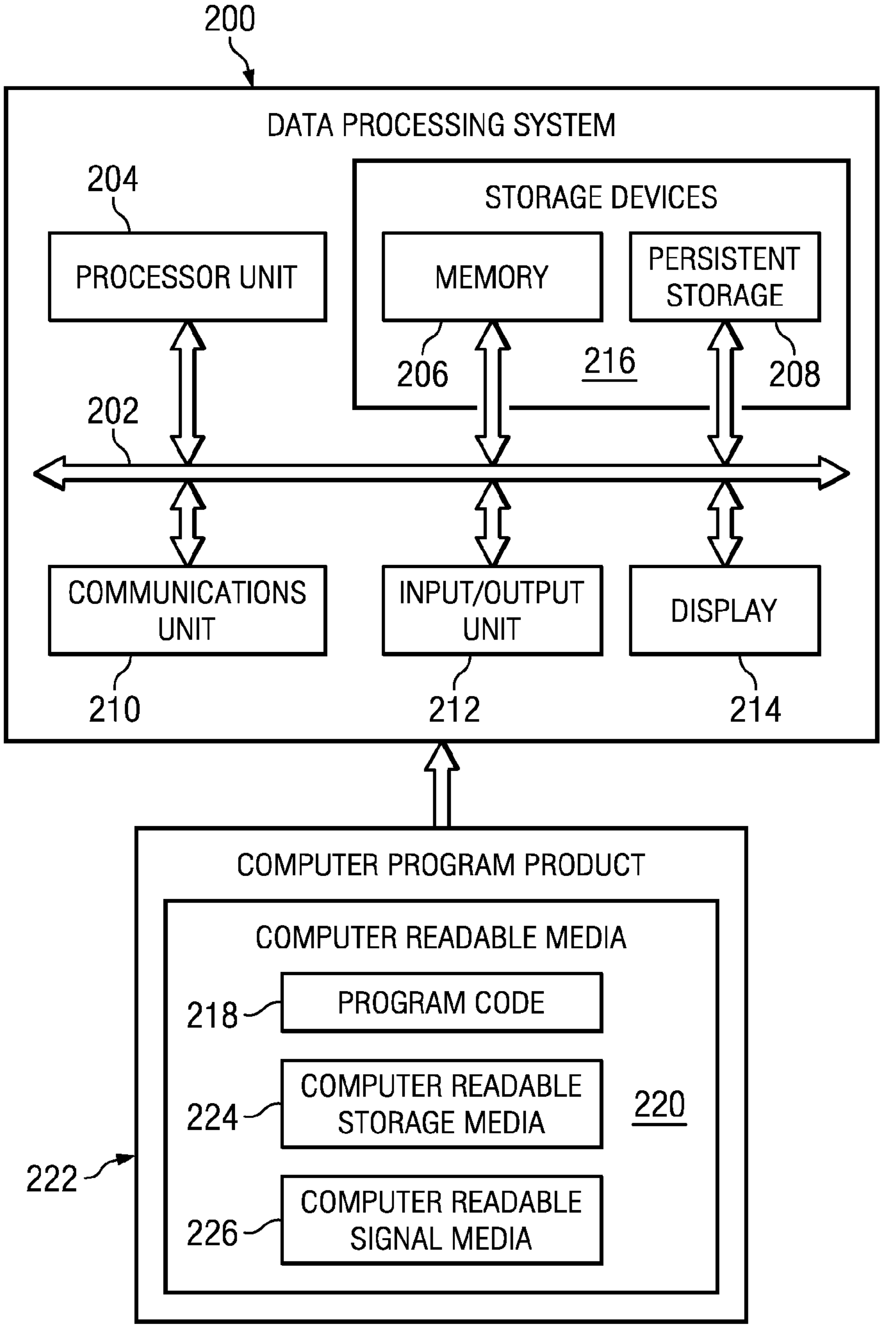
FIG. 2 is an illustration of a data processing system in accordance with an advantageous embodiment.

Turning now to FIG. 2, an illustration of a data processing system is depicted in accordance with an advantageous embodiment. In this illustrative example, data processing system 200 may be used to implement computer system 115 onboard aircraft 102 in FIG. 1. As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
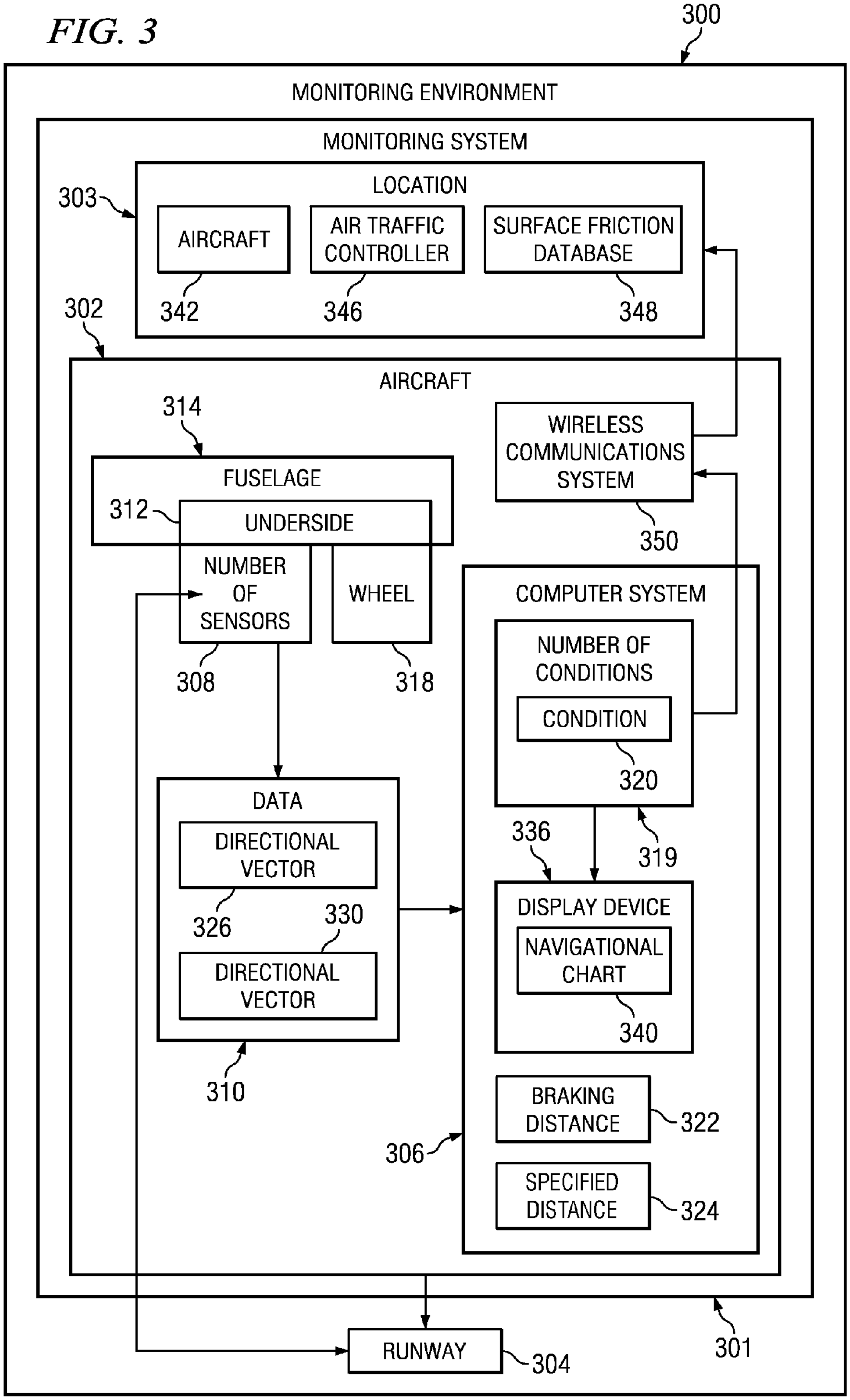
FIG. 3 is an illustration of a monitoring environment in accordance with another advantageous embodiment.

Turning now to FIG. 3, an illustration of a monitoring environment is depicted in accordance with another advantageous embodiment. Monitoring environment 300 is an example of one implementation of monitoring environment 100 in FIG. 1. As depicted, monitoring environment includes monitoring system 301. Monitoring system 301 may be comprised of aircraft 302 and/or location 303 remote to aircraft 302.

In this illustrative example, monitoring system 301 monitors conditions for runway 304 while aircraft 302 is performing an operation on runway 304. Runway 304 may comprise a runway, a taxiway, or any other suitable surface for moving aircraft while on the ground. The operation performed by aircraft 302 on runway 304 may be one of landing on runway 304, taking off from runway 304, taxiing on runway 304, or some other operation.

As depicted, aircraft 302 has computer system 306 and number of sensors 308 associated with aircraft 302.

Computer system 306 is an example of one implementation for computer system 115 onboard aircraft 302. Further, computer system 306 may be implemented using data processing system 200 in FIG. 2. Computer system 306 may be located onboard aircraft 302, partially onboard aircraft 302, or in a location elsewhere but accessible to systems onboard aircraft 302.

Computer system 306 receives data 310 from number of sensors 308. In this illustrative example, data 310 includes at least one of imaging data, radar data, light detection and ranging data (LIDAR), camera data, infrared data, and other suitable types of data.

In these advantageous embodiments, number of sensors 308 is associated with aircraft 302 by being attached to underside 312 of fuselage 314 of aircraft 302. In other advantageous embodiments, number of sensors 308 are not associated with aircraft 302 and are instead associated with runway 304 and/or the area surrounding runway 304. For example, number of sensors 308 may be located on the ground. Number of sensors 308 may include, for example, without limitation, at least one of a radar detector, a camera, a video camera, an infrared detector, and some other suitable type of sensor.

In this illustrative example, number of sensors 308 may be pointed towards wheel 318 of aircraft 302 to generate data 310 regarding runway 304. However, in other illustrative examples, number of sensors 308 may be pointed in any direction that allows number of sensors 308 to generate data 310 regarding runway 304.

Computer system 306 uses data 310 received from number of sensors 308 to identify number of conditions 319 for runway 304. Number of conditions 319 includes, for example, without limitation, at least one of standing water, snow, slush, ice, an inconsistency in the runway, a debris, an indentation, a plant growth extending onto the runway, and other types of conditions.

Data 310 may include directional vector 326 of wheel 318 and/or directional vector 330 of aircraft 302. Computer system 306 may identify condition 320 in number of conditions 319 on runway 304 when directional vector 330 of aircraft 302 differs from directional vector 326 of wheel 318. For example, if directional vector 326 of wheel 318 is aligned with directional guidance lines on runway 304 but directional vector 330 of aircraft 302 is identified as being towards the right side of runway 304, computer system 306 may identify condition 320 as skidding.

In another advantageous embodiment, computer system 306 may identify condition 320 for runway 304 if braking distance 322 is greater than specified distance 324. Braking distance 322 may be determined, for example, while aircraft 302 is decelerating on runway 304 during a landing operation. In these examples, braking distance 322 is the distance used by aircraft 302 to decelerate from the speed at which aircraft 302 contacts runway 304 during a landing operation to a selected speed. The selected speed may be zero or some other speed specified by an operator of aircraft 302. In one advantageous embodiment, the selected speed is a speed used for taxiing.

Once computer system 306 identifies number of conditions 319, computer system 306 presents number of conditions 319 on a display device 336 in computer system 306. Display device 336 may be, for example, a display screen, a touchscreen, or some other suitable type of display device.

As one illustrative example, number of conditions 319 is displayed on navigational chart 340 on display device 336. In this manner, computer system 306 updates navigational chart 340 with number of conditions 319 for runway 304 for use by an operator of aircraft 302. Number of conditions 319 may be displayed on navigational chart 340 as information points associated with runway 304 or as a list of conditions present in a geographic area of navigational chart 340.

Computer system 306 also sends number of conditions 319 to location 303 remote to aircraft 302. Location 303 may be a second aircraft, such as aircraft 342, air traffic controller 346, surface friction database 348, or some other suitable location. Number of conditions 319 may be sent to location 303 by computer system 306 using wireless communications system 350.

In some advantageous embodiments, aircraft 342 is an aircraft within a particular distance of runway 304. In other advantageous embodiments, aircraft 342 is executing a flight plan that involves landing on runway 304. Aircraft 342 may use number of conditions 319 to update a navigational chart aboard aircraft 342 or to alert the flight crew aboard aircraft 342 of number of conditions 319.

Location 303 may also be air traffic controller 346. Air traffic controller 346 may receive number of conditions 319 as a list or as information points on a navigational chart. Location 303 may also be surface friction database 348. Computer system 306 may send number of conditions 319 to surface friction database 348 such that surface friction database 348 is updated to store number of conditions 319.

In one advantageous embodiment, surface friction database 348 contains a measurement of friction at numerous points on the surface of runway 304. The measurement may be based on number of conditions 319. For example, when number of conditions 319 indicates the presence of ice on runway 304, surface friction database 348 may be updated to reflect reduced surface friction on runway 304. Surface friction database 348 may be stored at a regulatory authority, such as the Federal Aviation Administration in the United States.

The illustration of monitoring environment 300 in FIG. 3 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, directional vector 326 may be detected with respect to more than one wheel 318. Additionally, number of sensors 308 may be located in multiple locations around aircraft 302. For example, a sensor may be located in the nose area of aircraft 302 and pointed forward towards runway 304. Another sensor in number of sensors 308 may be located near the aft wheels of aircraft 302 and pointed toward runway 304.

Some elements of monitoring environment 300 may be located onboard aircraft 302 while other elements of monitoring environment 300 are located offboard aircraft 302. For example, in some advantageous embodiments, all components of computer system 306 are located on aircraft 302. In other advantageous embodiments, computer system 306 is not located onboard aircraft 302. For example, computer system 306 may be located at an airport or an airline. In yet other advantageous embodiments, some components of computer system 306 are located onboard aircraft 302 and other components of computer system 306 are located elsewhere, such as at an airport or an airline headquarters. Likewise, other elements of monitoring environment 300 may be located onboard aircraft 302 or elsewhere in different advantageous embodiments.

Figure 4:
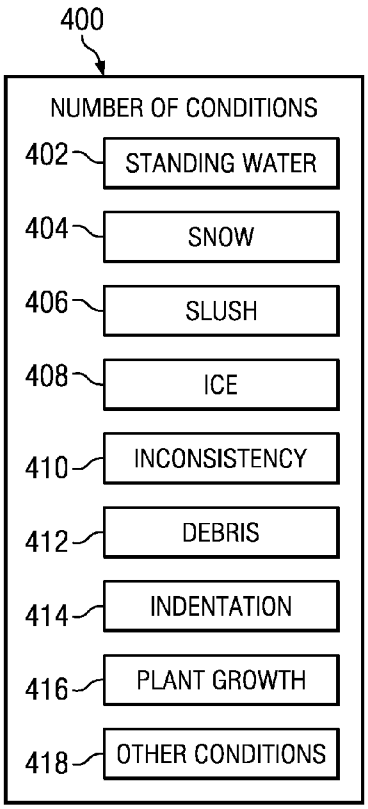
FIG. 4 is an illustration of a number of conditions in accordance with an advantageous embodiment.

Turning now to FIG. 4, an illustration of a number of conditions is depicted in accordance with an advantageous embodiment. Number of conditions 400 is an example of one implementation of number of conditions 319 in FIG. 3. Number of conditions 400 may be identified by a number of sensors, such as number of sensors 308 in FIG. 3.

In this illustrative example, number of conditions 400 includes standing water 402, snow 404, slush 406, ice 408, inconsistency 410, debris 412, indentation 414, and plant growth 416. Standing water 402 is any collection of water on the runway being monitored. The water may be draining or may be stagnant.

With respect to each of snow 404, slush 406, and ice 408, a sensor may be configured to identify number of conditions 400 only when a particular amount of accumulation has occurred on the runway, or when any accumulation has occurred.

Inconsistency 410 is any deviation from the design of the surface of the runway. For example, inconsistency 410 may be a pothole in the runway. An example of debris 412 is a piece of rubber from the tire of another aircraft. Indentation 414 is a groove or dip in the surface of the runway. In some advantageous embodiments, indentation 414 is caused by the wear associated with frequent use of the runway by aircraft.

Plant growth 416 may be any plant that extends onto the surface of the runway. In some advantageous embodiments, a computer system may be configured to identify a condition of plant growth 416 only when plant growth 416 extends onto the runway by more than a specified distance. For example, grass that extends onto the runway by more than about two linear feet may be identified as a condition affecting the runway.

Of course, number of conditions 400 may include other conditions 418. Other conditions 418 are any additional conditions in number of conditions 400 that are identified by a monitoring system, such as monitoring system 301. For example, other conditions 418 may include an uneven surface on the runway, cracks in the runway, or parts of a runway that have moved due to a seismic event.

Figure 5:
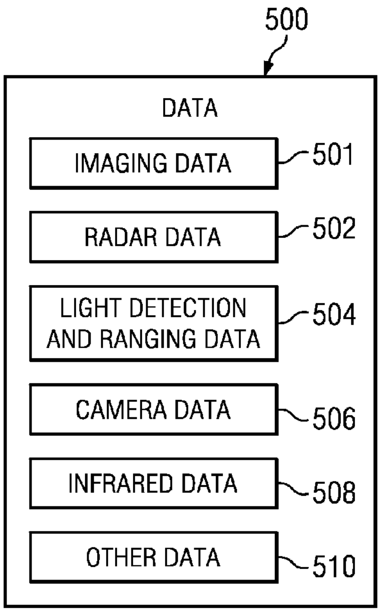
FIG. 5 is an illustration of data in accordance with an advantageous embodiment.

Turning now to FIG. 5, an illustration of data is depicted in accordance with an advantageous embodiment. Data 500 is an example of one implementation of data 310 in FIG. 3. Data 500 may be received by a computer system from a number of sensors, such as number of sensors 308 in FIG. 3. Data 500 may comprise at least one of imaging data 501, radar data 502, light detection and ranging data 504, camera data 506, and infrared data 508.

Of course, data 500 may also include other data 510. Other data 510 is data from another source. For example, other data 510 may include data for conditions that are part of a user input.

Figure 6:
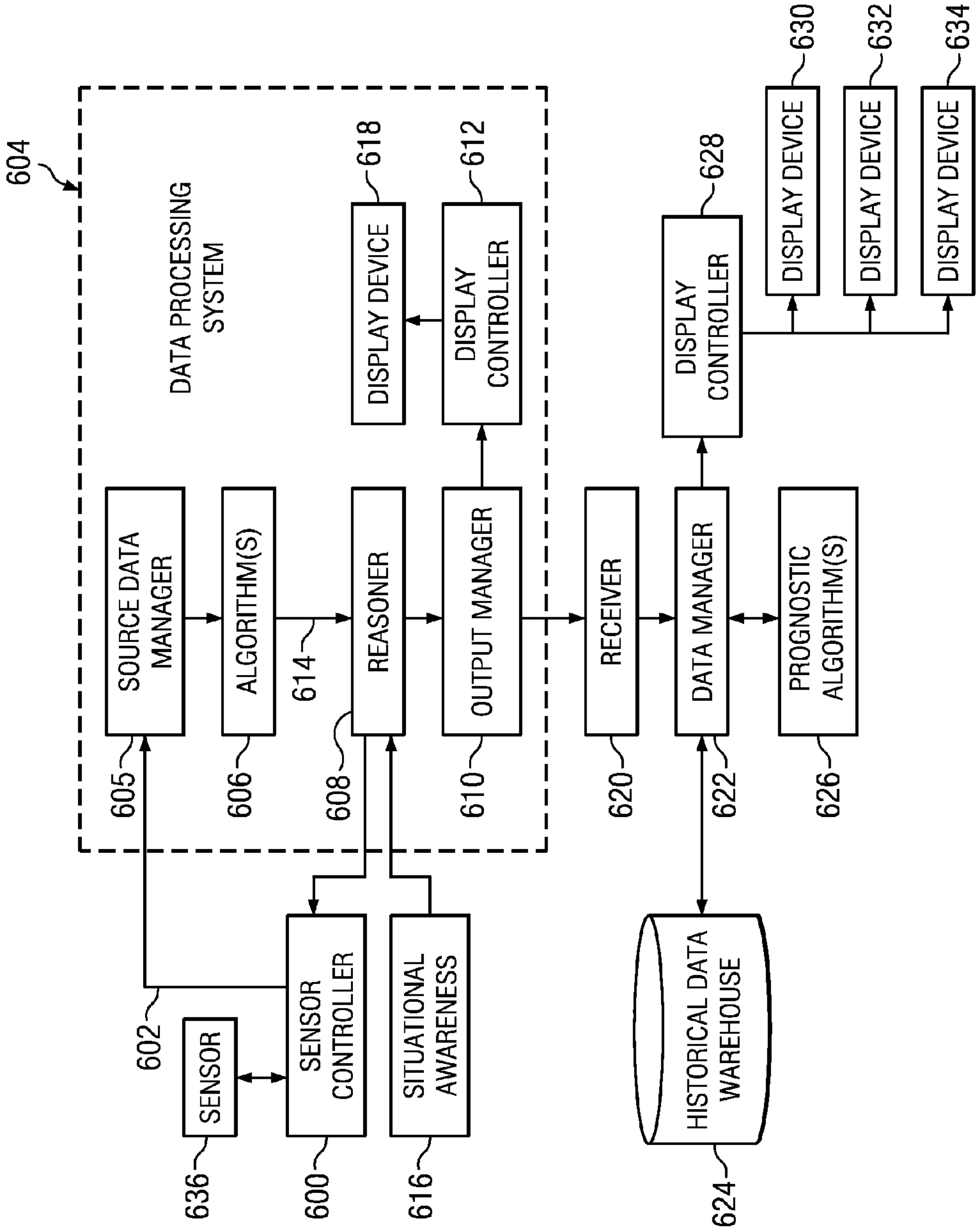
FIG. 6 is an illustration of a data flow for a monitoring environment in accordance with an advantageous embodiment.

With reference now to FIG. 6, an illustration of a data flow for a monitoring environment is depicted in accordance with an advantageous embodiment. The data flow illustrated in FIG. 6 is for a monitoring environment, such as monitoring environment 100 in FIG. 1 and/or monitoring environment 300 in FIG. 3.

In this illustrative example, sensor controller 600 may be implemented in a sensor, such as a sensor in number of sensors 308 in FIG. 3. Sensor 636 is a device that measures one or more properties and converts the measurement to data. For example, sensor 636 may generate imaging data and/or temperature data. In some advantageous embodiments, sensor 636 comprises a number of sensors 636. As used herein, "a number of" an element means one or more of the element. For example, "a number of sensors 636" means one or more sensors 636.

Sensor controller 600 controls the operation of sensor 636. Sensor controller 600 engages or disengages sensor 636, and/or controls a mode of sensor 636. For example, sensor controller 600 may set sensor 636 to a scanning mode. In a scanning mode, sensor 636 may generate data of a particular type and then generate data of a different type. The change of type may be periodic or determined based on the data being generated. For example, in advantageous embodiments in which sensor 636 comprises multiple sensors 636, sensor controller 600 may cause sensors 636 to generate temperature data for 10 seconds, and then generate imaging data for 10 seconds. In another such advantageous embodiment, sensor controller 600 may schedule a thermocouple sensor 636 to operate for ten seconds, and then schedule a camera sensor 636 to operate for ten seconds. Alternatively, sensor controller 600 may cause sensor 636 to generate imaging data until a condition occurs, such as landing of the aircraft is completed. Sensor controller 600 generates data 602. Data 602 may be, for example, data 310 in FIG. 3 and/or data 500 in FIG. 5.

Sensor controller 600 sends data 602 to data processing system 604. Data processing system 604 may be implemented using data processing system 200 in FIG. 2 and/or computer system 306 in FIG. 3. As depicted, source data manager 605, reasoner 608, output manager 610, and display controller 612 are implemented within data processing system 600. Source data manager 605 receives data 602 from sensor controller 600. Source data manager 605 may store data 602 and/or make data 602 available to be processed by algorithms 606 running on data processing system 604.

Algorithms 606 perform a number of operations using data 602 to generate data. In this advantageous embodiment, algorithms 606 are algorithms that identify a number of conditions present on the runway. The number of conditions may be an example implementation of number of conditions 400 in FIG. 4. For example, algorithms 606 may be a fast Fourier transform or digital signal filtering or wavelets. After being processed by algorithms 606 running on data processing system 604, data 614 is sent to reasoner 608. Reasoner 608 identifies a number of conditions present on the runway using data 614. The number of conditions may be, for example, number of conditions 400 in FIG. 4. Reasoner 608 also determines whether adjustments are to be made to sensor controller 600. For example, reasoner 608 may determine that sensor controller 600 is configured to be too sensitive. Thus, sensor controller 600 may decrease sensitivity of sensor 636. In some advantageous embodiments, reasoner 608 uses situational awareness 616 to identify the number of conditions within data 614.

Situational awareness 616 is data that describes the physical environment being monitored. In some advantageous embodiments, situational awareness 616 comprises aircraft operational data and/or weather data. For example, situational awareness 616 may comprise any combination of temperature data, weather data, airspeed, weight on wheels of the aircraft, angle of attack of the aircraft, weather forecast data, or other suitable environmental data.

Reasoner 608 sends the number of conditions identified to output manager 610. Output manager 610 sends the number of conditions to display controller 612 for presentation. Display controller 612 presents the number of conditions on display device 618. In some illustrative examples, the number of conditions may be presented on a navigational chart displayed on display device 618.

Output manager 610 also sends the number of conditions to receiver 620 using a wireless communications system. In other advantageous embodiments, output manager 610 may use a wired communications system. Receiver 620 may be in a location remote to the aircraft having data processing system 604. For example, receiver 620 may be in a second aircraft or an air traffic controller.

Receiver 620 sends the number of conditions to data manager 622. Data manager 622 sends the number of conditions to historical data warehouse 624. Historical data warehouse 624 is a database storing data about conditions for the runway over a period of time, such as, for example, a number of months or a number of years. Data manager 622 also retrieves data from historical data warehouse 624. Data manager 622 sends information in the form of the data retrieved from historical data warehouse 624 and the number of conditions received from receiver 620 to prognostic algorithms 626.

Prognostic algorithms 626 use the data received from data manager 622 to make predictions about the number of conditions present on the runway or other conditions that may develop on the runway. For example, prognostic algorithms may be used to determine that ice accumulation on the runway will increase by one inch every two hours, based on the data received from data manager 622. In another advantageous embodiment, prognostic algorithms may generate a prediction that a crack present on the runway will grow at a particular rate. The predictions generated by prognostic algorithms 626 are sent back to data manager 622. Data manager 622 sends these predictions and/or the number of conditions received from receiver 620 to display controller 628.

Display controller 628 presents the information received on display device 630, display device 632, and display device 634. Display devices 630, 632, and 634 may be located in the same location or different locations. In some advantageous embodiments, display device 630 is located in a cockpit of the aircraft, display device 632 is located in an air traffic control tower, and display device 634 may be located at an airline operations center. Of course, additional display controllers 628 may be present to present data on display devices 630, 632, and 634 in some advantageous embodiments.

Figure 7:
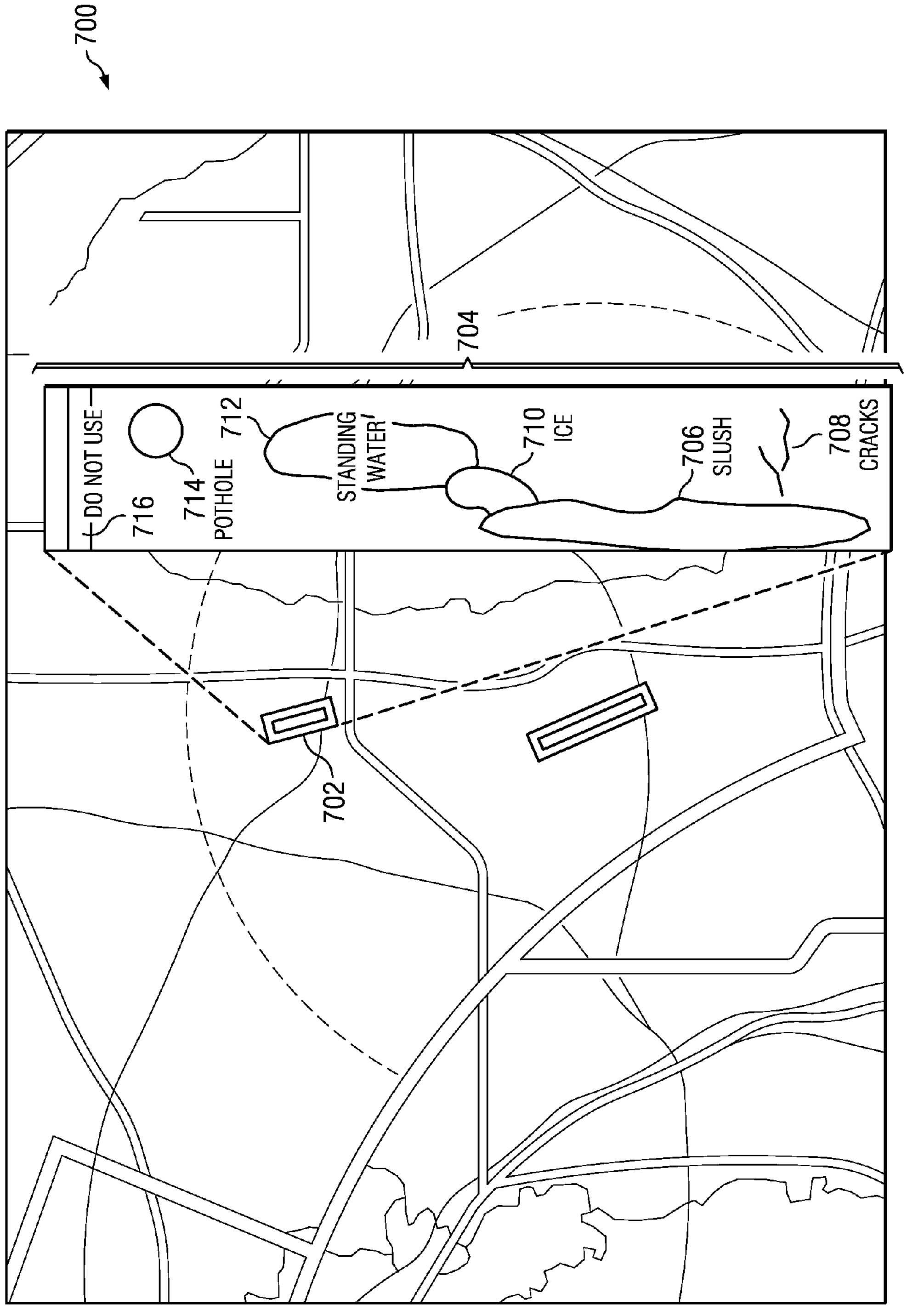
FIG. 7 is an illustration of a graphical user interface presenting a navigation chart with a number of conditions for a runway in accordance with an advantageous embodiment.

With reference now to FIG. 7, an illustration of a graphical user interface presenting a navigational chart with a number of conditions for a runway is depicted in accordance with an advantageous embodiment. Navigational chart 700 is an example implementation of navigational chart 340 in FIG. 3. Navigational chart 700 may be presented using a display device, such as display device 336 in FIG. 3. In these examples, navigational chart 700 presents a runway at an airport. However, navigational chart 700 may present other information in other advantageous embodiments.

Runway 702 is located on navigational chart 700. Runway 702 represents a real world runway that has a number of conditions present on the real world runway. Runway 702 presents the number of conditions present on the real world runway at the time navigational chart 700 is presented. The number of conditions may be an example implementation of number of conditions 400 in FIG. 4.

The number of conditions present on runway 702 at the time navigational chart 700 is presented are shown on runway 704. Runway 704 presents additional detail about runway 702 and is also presented using a display device. Specifically, runway 704 presents the number of conditions present on the real world runway represented by runway 702 at the time navigational chart 700 is presented. The number of conditions presented on runway 704 may be identified by an aircraft in which navigational chart 700 is being presented. In other advantageous embodiments, the number of conditions presented on runway 704 are received from another aircraft, such as aircraft 302 in FIG. 3.

Runway 704 is presented with a number of conditions. The number of conditions, in these examples, comprises slush 706, cracks 708, ice 710, standing water 712, pothole 714, and section 716. Of course, additional types of conditions may be presented in other advantageous embodiments. For example, plant overgrowth onto runway 704 or snow present on runway 704 may be presented in other advantageous embodiments. In an advantageous embodiment in which snow is presented on runway 704, a different visual indicator may be used for snow that is compressed more than a specified amount. The number of conditions are presented on runway 704 in the locations in which they were identified on runway 704. In other words, the location at which the number of conditions are presented represents the location of each of the number of conditions on the actual runway being represented by runway 704.

Slush 706 represents a mixture of snow and water. Cracks 708 are inconsistencies in the surface of runway 704. The inconsistencies may be caused by use of runway 704 by one or more aircraft, or another object impacting runway 704. Ice 710 represents frozen water present on runway 704. Standing water 712 represents liquid water on runway 704 that is stagnant and/or not draining from runway 704 at a particular rate. Pothole 714 is an inconsistency in runway 704 that is greater than a particular length and/or width. Section 716 represents a section of runway 704 that exceeds a particular degree or size of inconsistency in runway 704. In this advantageous embodiment, section 716 is presented with a warning not to use section 716 of runway 704. The warning may indicate to a pilot that section 716 of the real world runway represented by runway 704 should not be used during takeoff, taxiing, or landing of an aircraft. Section 716 may also be identified using another source, such as being designated by a user input.

Of course, runway 704 may be presented a number of different ways, and the depiction of runway 704 should not be construed as limiting. In other advantageous embodiments, runway 704 is presented with various color-coded areas that indicate a severity of an inconsistency. For example, one area of runway 704 may be presented in red to indicate that the area of runway 704 should not be used by an aircraft, and another area of runway 704 may be presented in blue to indicate that standing water is located in the blue area of the actual runway represented by runway 704.

Figure 8:
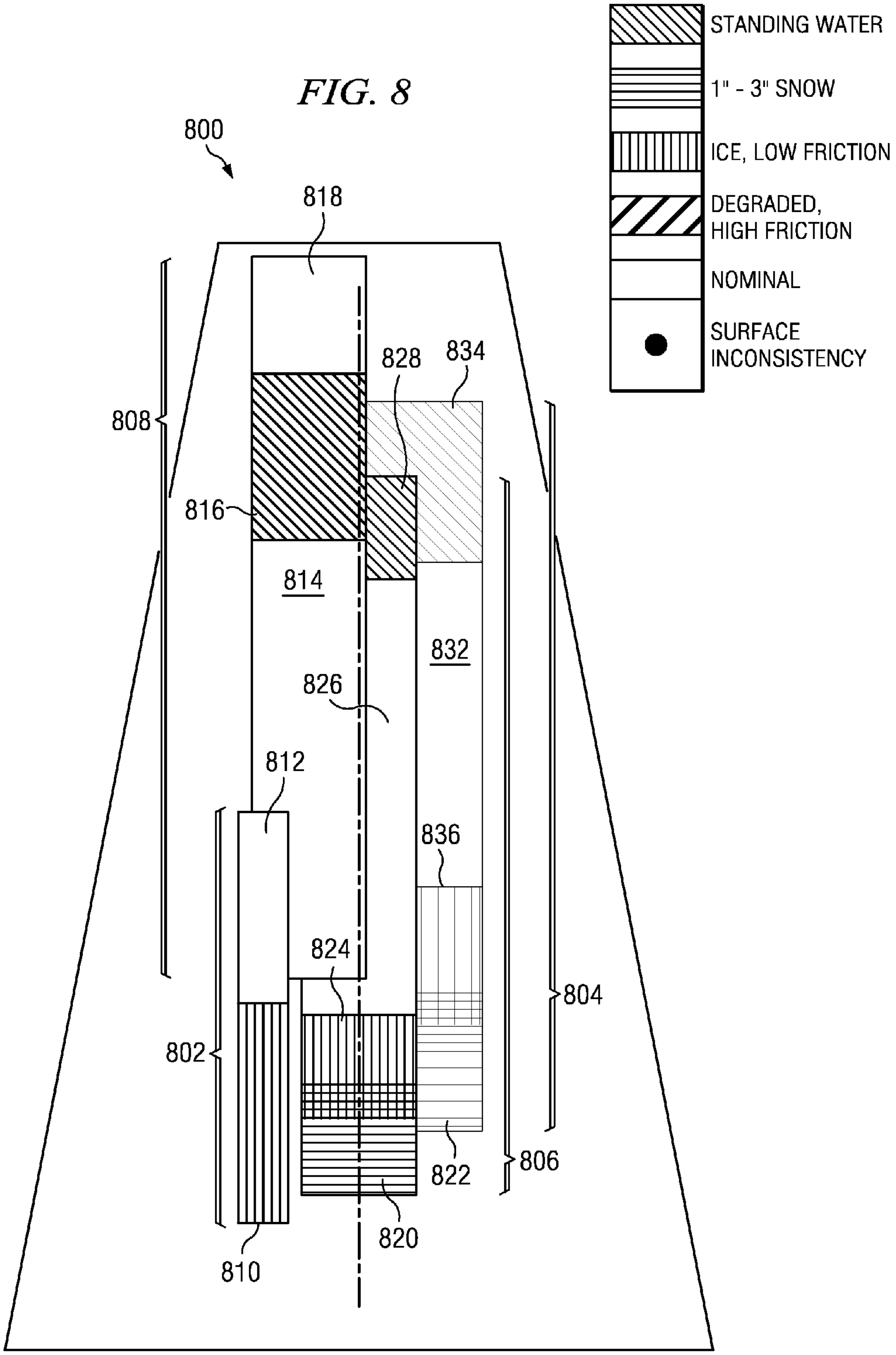
FIG. 8 is an illustration of another graphical user interface presenting a runway in accordance with an advantageous embodiment.

With reference now to FIG. 8, an illustration of another graphical user interface presenting a runway is depicted in accordance with an advantageous embodiment. Runway 800 may be another example implementation of runway 704 in FIG. 7. Runway 800 may be presented on and/or with navigational chart 700 or in another graphical user interface.

Areas 802, 804, 806, and 808 indicate that data has been generated for the corresponding portions of runway 800. As used herein, the corresponding portions of runway 800 for areas 802, 804, 806, and 808 means the portions of the actual runway represented by runway 800 that are located substantially within areas 802, 804, 806, and 808 on runway 800. The data may comprise a number of conditions, such as number of conditions 319 in FIG. 3.

In some advantageous embodiments, areas 802, 804, 806, and 808 are presented in the order that the data was generated. For example, area 804 is presented as faded and underneath areas 806 and 808. Presenting area 804 underneath areas 806 and 808 indicates that the data represented by area 804 was generated prior to areas 806 and 808. In some advantageous embodiments, presenting area 804 as faded indicates that the data contained in area 804 was generated more than a specified amount of time prior to runway 800 being presented.

Portions 810 and 812 are presented within area 802. Portion 810 indicates that a condition of ice is present in the corresponding portion of runway 800. Portion 812 indicates that no condition is present in the corresponding portion of runway 800.

Portions 814, 816, and 818 are presented within area 808. Portion 814 indicates that no condition is present in the corresponding portion of runway 800. Portion 816 indicates that standing water was identified in the corresponding portion of runway 800. Standing water is any collection of water on the runway being monitored. The water may be draining or may be stagnant. Portion 818 indicates that no condition is present in the corresponding portion of runway 800.

Portions 820, 824, 826, and 828 are presented within area 806. Portion 820 indicates that a condition of between about one and three inches of snow was identified on the corresponding portion of runway 800. Of course, the amount of snow in this advantageous embodiment is an example and should not be construed as limiting. The amount of snow indicated by portion 820 may be any amount or range of amounts. For example, the amount of snow indicated by portion 820 may be about two to three inches or about one to six inches. Multiple ranges may also be present with the same or different indicators. For example, another portion may indicate an amount of snow between about four and six inches. The amount may be scaled by the geographic region of runway 800 or received as a user input.

Portion 824 indicates that a condition of ice with low friction was identified in the corresponding portion of runway 800. In some advantageous embodiments, portions 820 and 824 are presented with colors that transition into each other. In such an advantageous embodiment, both conditions of ice with low friction and between about one and three inches of snow may be present in the corresponding portion of runway 800. Portion 826 indicates that no condition is present in the corresponding portion of runway 800. Portion 828 indicates that a condition of standing water is present in the corresponding portion of runway 800.

Portions 822, 832, 834, and 836 are presented within area 804. Portion 822 indicates that a condition of standing water was identified on the corresponding portion of runway 800. Portion 836 indicates that a condition of ice with low friction was identified in the corresponding portion of runway 800. In some advantageous embodiments, portions 822 and 836 are presented with colors that transition into each other. In such an advantageous embodiment, both conditions of ice with low friction and standing water may be present in the corresponding portion of runway 800. Portion 832 indicates that no condition is present in the corresponding portion of runway 800. Portion 834 indicates that standing water was identified in the corresponding portion of runway 800.

Figure 9:
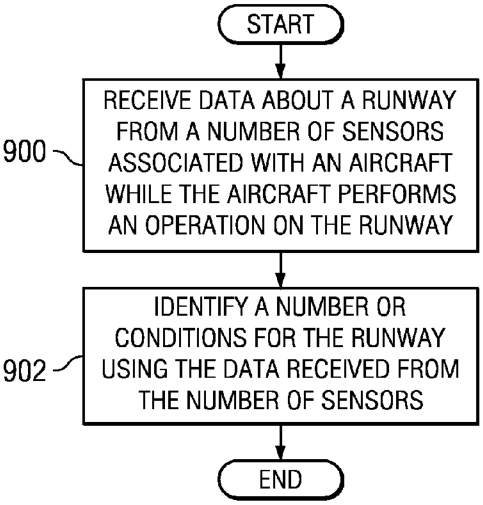
FIG. 9 is an illustration of a flowchart of a process for monitoring a runway in accordance with an advantageous embodiment.

With reference now to FIG. 9, an illustration of a flowchart of a process for monitoring a runway is depicted in accordance with an advantageous embodiment. The process illustrated in FIG. 9 may be implemented in monitoring environment 300 for runway 304 in FIG. 3.

The process begins by receiving data about the runway from a number of sensors associated with an aircraft while the aircraft is using the runway (operation 900). In operation 900, the data received from the number of sensors may include, for example, without limitation, imaging data, radar data, light detection and ranging data (LIDAR), camera data, infrared data, and/or other suitable types of data.

Thereafter, the process identifies a number of conditions for the runway using the data received from the number of sensors (operation 902), with the process terminating thereafter. In operation 902, the number of conditions include at least one of standing water, snow, slush, ice, an inconsistency in the runway, debris on the runway, an indentation, a plant growth extending onto the runway, and some other suitable runway condition.

Figure 10:
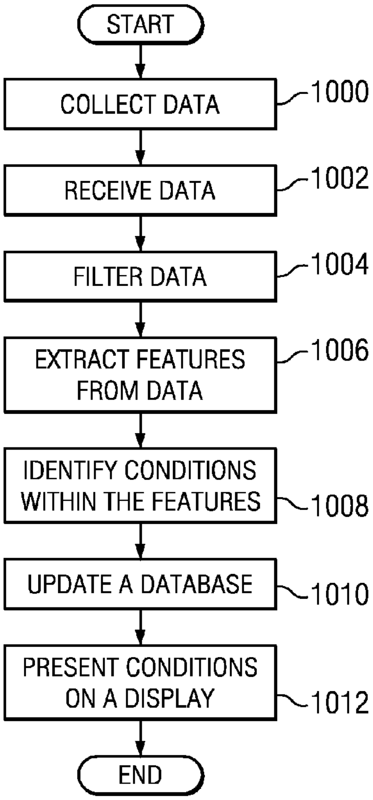
FIG. 10 is an illustration of a flowchart of an additional process for monitoring a runway in accordance with an advantageous embodiment.

Turning now to FIG. 10, an illustration of a flowchart of an additional process for monitoring a runway is depicted in accordance with an advantageous embodiment. The process may be performed in monitoring environment 300 by computer system 306 in FIG. 3.

The process begins by collecting data (operation 1000). The data may be collected by a number of sensors, such as number of sensors 308 in FIG. 3. The data collected may be, for example, altitude of the aircraft, whether the aircraft is taking off or landing, and whether the aircraft is executing a flight plan.

The process then receives the data (operation 1002). The data that is received is at least some of the data collected in operation 1000. In operation 1002, the data may be combined with other data, such as situational awareness 616 in FIG. 6. The data may include any combination of temperature data, weather data, weather forecasts, airspeed of the aircraft, weight on wheels of the aircraft, and angle of attack of the aircraft.

The process then filters the data (operation 1004). Filtering the data may comprise removing noise from the data, and checking validity of the data. Checking validity of the data may comprise determining whether the data is within a predetermined range for the particular type of data. Data exceeding the prespecified limits may be discarded. For example, temperature data that exceeds about 250 degrees Fahrenheit may be discarded.

The process then extracts features from the data (operation 1006). Extracting features from the data comprises performing a transform on the data. For example, the data may be transformed using a fast Fourier transform and/or other suitable digital signal processing. The transform may indicate a frequency of a particular value or series of values that occurs in the data.

The process then identifies conditions within the features (operation 1008). In some advantageous embodiments, the features extracted in operation 1006 are represented by one or more numbers. The numbers may be compared with predetermined or specified values to determine whether a particular type of data indicates the presence of a type of condition on the runway. For example, the numeric value extracted in operation 1006 with respect to snow measurement may be identified as the presence of two inches of snow on a particular portion of the runway.

The process then updates a database with the number of conditions (operation 1010). The database may contain a number of conditions for a number of runways. In one advantageous embodiment, the database is a surface friction database. The surface friction database may be maintained by an airport, an airline, a regulatory authority, or any other suitable party. The process may update the surface friction database with the surface friction detected on the runway at the time the data was generated and/or a number of other conditions present on the runway at the time the data was generated. The process terminates thereafter.

The process then presents the conditions on a display (operation 1012). The display may be located onboard the aircraft, onboard another aircraft, in an air traffic control area, at an airline operations center or any other suitable location. The conditions may be presented on a navigational chart, in some advantageous embodiments, such as navigational chart 700 in FIG. 7.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. For example, operation 1012 may be performed prior to operation 1010 or at the same time as operation 1012. Also, other blocks may be added in addition to the illustrated blocks in a flowchart or block diagram.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for monitoring a runway, the method comprising:

receiving data about the runway from a number of sensors associated with an aircraft while the aircraft performs an operation on the runway;

processing the data received from the number of sensors, wherein the processing is performed by a data processing system in the aircraft to produce processed data;

determining a number of conditions are present on the runway using the processed data; and making predictions about the number of conditions present on the runway or other conditions that may develop on the runway at a future time using prognostic algorithms, the number of conditions, and historical data, wherein the data processing system makes the predictions, wherein the predictions include a rate of growth of a condition on the runway.

2. The method of claim 1 further comprising:

sending the number of conditions to a location remote to the aircraft.

3. The method of claim 2, wherein the aircraft is a first aircraft and the location is selected from one of a second aircraft and an air traffic controller.

4. The method of claim 1, wherein the aircraft is a first aircraft and further comprising:

controlling operation of a second aircraft using the runway after the first aircraft based on the number of conditions.

5. The method of claim 1, wherein the number of sensors being associated with the aircraft further comprises the number of sensors being mounted on an underside of a fuselage of the aircraft.

6. The method of claim 1, wherein the data received from the number of sensors includes at least one of imaging data, radar data, light detection and ranging data, camera data, or infrared data.

7. The method of claim 1, wherein the step of receiving the data about the runway from the number of sensors comprises:

identifying a braking distance for the aircraft braking on the runway;

determining that a condition in the number of conditions is present when the braking distance is greater than specified distance.

8. The method of claim 7 further comprising:

determining whether the condition in the number of conditions is present when a directional vector of the aircraft and a directional vector of a wheel on the aircraft are different.

9. The method of claim 1, wherein the number of conditions are selected from at least one of an inconsistency in the runway, a debris, an indentation, or a plant growth extending onto the runway.

10. The method of claim 2, wherein the location is a surface friction database.

11. The method of claim 1 further comprising:

updating a navigational chart with the number of conditions.

12. An apparatus comprising:

a number of sensors associated with an aircraft, wherein the number of sensors is configured to generate data about a runway while the aircraft performs an operation on the runway;

a computer system in the aircraft, wherein the computer system is configured to receive the data from the number of sensors, process the data received from the number of sensors to produce processed data, determine a number of conditions present on the runway using the processed data, and make predictions about the number of conditions present on the runway or other conditions that may develop on the runway at a future time using prognostic algorithms, the number of conditions, and historical data, wherein the data processing system makes the predictions, wherein the predictions include a rate of growth of a condition on the runway.

13. The apparatus of claim 12, wherein the aircraft is a first aircraft and wherein the computer system is further configured to control operation of a second aircraft using the runway after the first aircraft using the number of conditions.

14. The apparatus of claim 12, wherein the number of sensors being associated with the aircraft further comprises the number of sensors being mounted on an underside of a fuselage of the aircraft.

15. The method of claim 1, wherein the data processing system uses situational awareness to determine the number of conditions using the processed data.

16. The method of claim 15, wherein the situational awareness comprises aircraft operational data or weather data.

17. The method of claim 15, wherein the situational awareness comprises a combination of temperature data, weather data, airspeed, weight on wheels of the aircraft, angle of attack of the aircraft, weather forecast data.

18. The method of claim 1 further comprising:

determining whether a condition in the number of conditions is present when a directional vector of the aircraft and a directional vector of a wheel on the aircraft are different.

19. The method of claim 1, wherein processing the data received from the number of sensors comprises:

filtering the data, wherein filtering comprises removing noise from the data, and checking validity of the data; and extracting features from the data, wherein extracting the features from the data comprises performing a transform on the data.

20. The method of claim 1, wherein processing the data received from the number of sensors results in a numerical representation, and wherein determining a number of conditions are present on the runway using the processed data includes comparing the numeral representation with a predetermined value to determine whether a particular type of data indicates the presence of a type of condition on the runway.

* * * * *